United States Patent [19]

Anzai

[11] Patent Number: 5,442,171

[45] Date of Patent: Aug. 15, 1995

[54] OPTICAL SYSTEM INCLUDING PROVISIONS FOR CORRECTING SCANNING BEAM SPOT DISPLACEMENTS DUE TO CHANGING AMBIENT CONDITIONS

[75] Inventor: Susumu Anzai, Saitama, Japan

[73] Assignee: Fuji Xerox Co., Ltd., Tokyo, Japan

[21] Appl. No.: 191,480

[22] Filed: Feb. 4, 1994

[30] Foreign Application Priority Data

Feb. 10, 1993 [JP] Japan ................................. 5-044378

[51] Int. Cl.⁶ ............................................... H01J 3/14
[52] U.S. Cl. .................................... 250/235; 359/216
[58] Field of Search ...................... 250/235, 236, 203.7, 250/237 G, 208.1, 208.6; 358/494; 359/196, 216, 197

[56] References Cited

U.S. PATENT DOCUMENTS 4,206,348 6/1980 Davy et al. .
4,587,420 5/1986 Noguchi et al. ................... 250/235
5,105,296 4/1992 Cho et al. .

FOREIGN PATENT DOCUMENTS

0342936A2 11/1989 European Pat. Off. .
0396041A2 11/1990 European Pat. Off. .

OTHER PUBLICATIONS

Casler et al., "Deflection Sensor For Optical Scanners," IBM Technical Disclosure Bulletin, vol. 15, No. 1, Jun. 1972.
Patent Abstracts of Japan, Publication No. JP 60100113, Apr. 1985.

*Primary Examiner*—Edward P. Westin
*Assistant Examiner*—Que T. Le
*Attorney, Agent, or Firm*—Finnegan, Henderson, Farabow, Garrett & Dunner

[57] ABSTRACT

A beam spot detector is disposed on an extension of a surface to be scanned by a beam of light. The beam spot detector has a mask in front thereof, the mask having a side which the beam of light intersects perpendicularly and a side which the beam of light intersects obliquely. An output signal of the detector is differentiated at a differentiating circuit, and positive and negative peak values are held at a peak hold circuit. A CPU calculates diameters of the beam of light in both a main scanning direction and an auxiliary scanning direction from the peak values. If the beam of light is out of focus, then the CPU outputs adjustment signals. A counter calculates a width of the output signal of the beam spot detector and outputs the calculated width to a CPU. The CPU compares the received width with a reference to detect a displacement in the auxiliary scanning direction (displacement of registration) and outputs a correction signal.

3 Claims, 5 Drawing Sheets

FIG. 3(b)

REGISTRATION DETECTION
(OUTPUT OF AMPLIFIER 8)

FIG. 3(c)

BEAM DIAMETER DETECTION
(OUTPUT OF DIFFERENTIATING CIRCUIT 9)

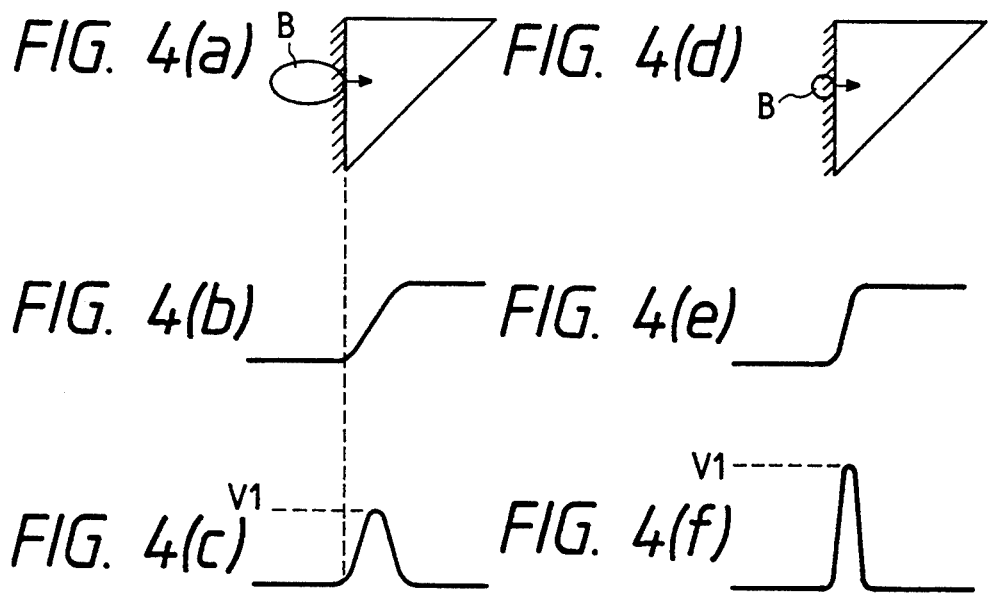
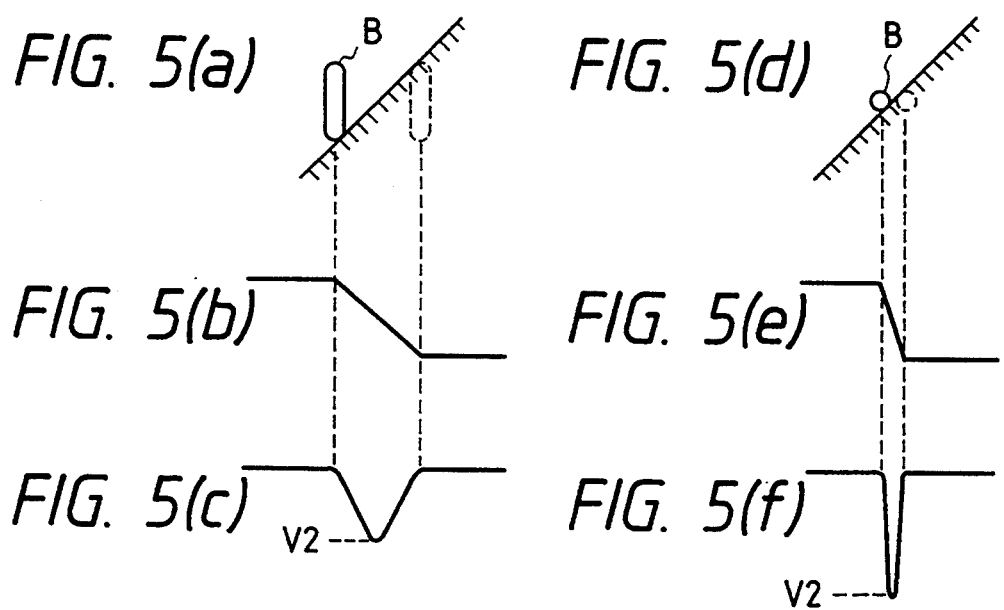

OPTICAL SYSTEM INCLUDING PROVISIONS FOR CORRECTING SCANNING BEAM SPOT DISPLACEMENTS DUE TO CHANGING AMBIENT CONDITIONS

BACKGROUND OF THE INVENTION

1. Field of the Invention

The present invention relates to scanning optical systems that scan a surface to be scanned by directing a beam of light thereto from a light source through a deflector and a lens system. More particularly, the present invention is directed to a scanning optical system having a correcting function that is designed to detect a displacement from the focus of an image forming spot of a beam of light which is on the surface to be scanned, the displacement being attributable to changes in ambient conditions such as temperature.

2. Discussion of the Related Art

Recording apparatuses using scanning optical systems are widely used in recent years. Examples are laser beam printers, which modulate a laser beam source in accordance with an image signal, cyclically deflect a laser beam from the modulated laser beam source with a deflector, converge the laser beam in spot form on a photosensitive recording medium with a lens system, and make a recording of an image by exposing the image through scanning.

In such conventional laser beam printers, a problem has been encountered. That is, changes in ambient temperature cause thermal deformation of components constituting the lens system, and as a result, the laser beam converging position on the photosensitive body is displaced, thus causing impairment of image quality.

To overcome this problem, e.g., Japanese Patent Unexamined Publication No. Hei 2-73212 discloses a system in which focus adjustment is made by disposing a plurality of detectors, each having an opening in a direction parallel with a scanning direction, at positions optically equivalent to a surface to be scanned and by comparing or calculating signals from detecting sections thereof.

However, the above-mentioned conventional system uses a plurality of light beam detectors, and this construction presents the problem of requiring not only a large installation space but also a large cost.

SUMMARY OF THE INVENTION

The present invention has been made to eliminate the above-mentioned problems associated with the conventional systems and therefore an object of the invention is to provide a scanning optical system capable of detecting a displacement from the focus and correcting such displacement with a simple construction and an easy operation.

To achieve the above object, the invention is applied to a scanning optical system for directing a beam of light from a light source onto a surface to be scanned by causing the beam of light to scan and converge onto the surface to be scanned by a deflector and a lens system. The scanning optical system is characterized as including: a beam spot detector being disposed on an extension of the surface to be scanned and having a mask with a side which the scanning beam of light intersects substantially perpendicularly and a side which the scanning beam of light intersects obliquely; a means for detecting conditions of convergence of the beam of light in a main scanning direction and in an auxiliary scanning direction from peak values of a differentiated waveform of a detected output from the beam spot detector; and a means for detecting a displacement in the auxiliary scanning direction of the beam of light from a width of the detected output.

According to the invention, not only the conditions of convergence of a beam of light in both main and auxiliary scanning directions but also the displacement of the beam of light in the auxiliary scanning direction can be detected at the same time by a single beam spot detector.

Further, as a result of such operation, only a small space is required for the installation of the beam spot detector.

BRIEF DESCRIPTION OF THE DRAWINGS

The above and other objects and features of the present invention will be more apparent from the following description taken in conjunction with the accompanying drawings.

FIGS. 3(a) to 3(c) are diagrams showing the waveform of an output of the beam spot detector and a differentiated waveform thereof;

FIGS. 4(a) to 4(f) are diagrams showing a principle for measuring the diameter of a beam of light in a main scanning direction;

FIGS. 5(a) to 5(f) are diagrams showing a principle for measuring the diameter of the beam of light in an auxiliary scanning direction;

DETAILED DESCRIPTION OF THE PREFERRED EMBODIMENTS

Figure 1:
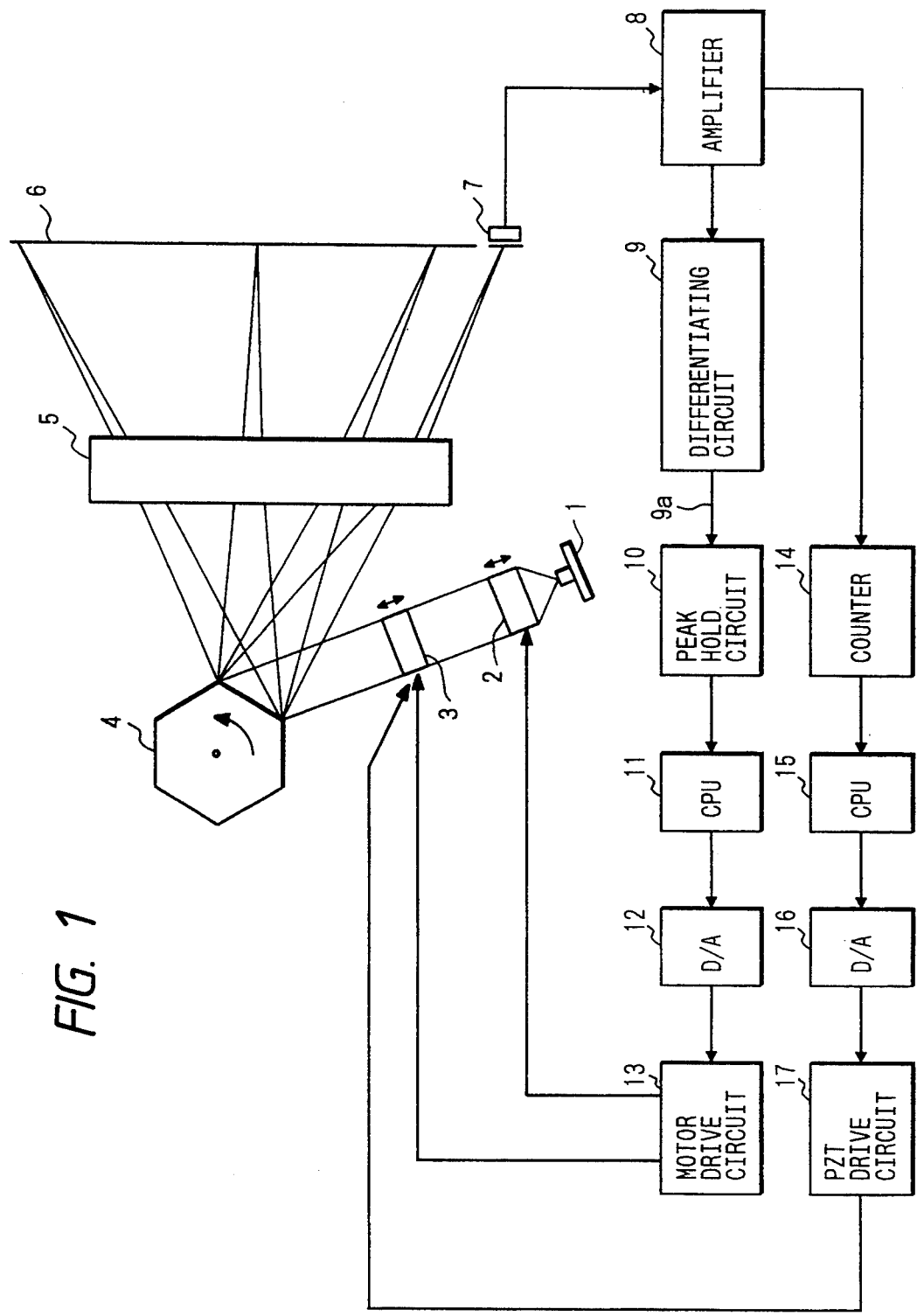
FIG. 1 is a block diagram showing a configuration according to a first embodiment of the invention.

The invention will be described in detail with reference to the drawings. FIG. 1 is a schematic diagram showing a configuration according to a first embodiment of the invention.

In FIG. 1, reference numeral 1 designates a laser beam source; 2, a main scanning cylindrical lens having refractive power in a main scanning direction to move the focus in the main scanning direction, and can move in directions of arrows by a not shown motor; 3, an auxiliary scanning cylindrical lens having refractive power in an auxiliary scanning direction to move the focus in the auxiliary scanning direction, and can move in directions of arrows and in directions perpendicular to such directions by a not shown motor.

Reference numeral 4 designates a rotary polygon mirror; 5, fθ lens; 6, a photosensitive recording drum, which is a surface to be scanned; and 7, a beam spot detector disposed on an extension of the surface to be scanned and having a predetermined opening and a predetermined photoelectric conversion surface for photoelectrically converting a spot of the laser beam.

Reference numeral 8 designates an amplifier for amplifying an electric signal from the beam spot detector 7; 9, a differentiating circuit for differentiating a signal from the amplifier 8; and 10, a peak hold circuit for holding peak values of an output signal from the differentiating circuit 9.

Reference numeral 11 designates a CPU for converting the peak values held by the peak hold circuit 10 into beam diameter data; 12, a digital-to-analog (D/A) converter; and 13, a motor drive circuit for moving the main scanning cylindrical lens and the auxiliary scanning cylindrical lens back and forth in the direction of the optical axis.

Reference numeral 14 designates a counter for counting a time width of the signal outputted from the amplifier 8; 15, a CPU for detecting a degree to which the time width deviates from a reference; 16, a D/A converter for converting the deviation outputted from the CPU 15 to an analog signal; and 17, a PZT drive circuit for driving a piezoelectric element (PZT).

Figure 2A:
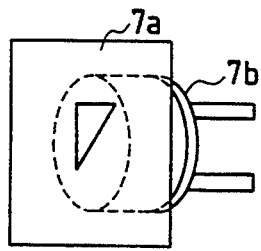
FIGS. 2(a) to 2(c) are diagrams showing exemplary masks arranged in front of a beam spot detector.
Figure 2B:
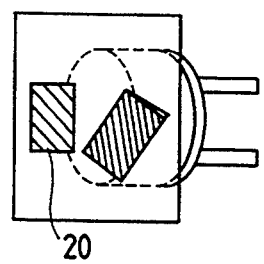
Figure 2C:
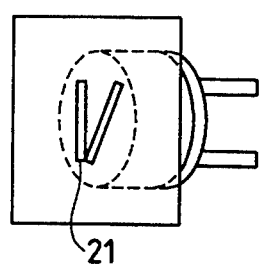
Figure 3A:
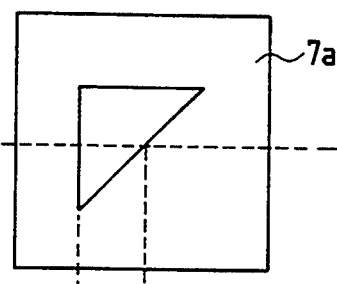

An example of the beam spot detector 7 will be described next with reference to FIGS. 2(a) to 2(c). As shown in FIG. 2(a), the beam spot detector 7 includes a triangular mask 7a and a photoelectric conversion element 7b disposed at the back thereof. As shown in FIG. 3(a), the triangular mask 7a has a side which the beam of light intersects perpendicularly and a side which the beam of light intersects obliquely. As shown in FIG. 2(b), the triangular mask may be substituted by knife edges 20 or slits 21.

If the waveform of an output of the beam spot detector 7 is as shown in FIG. 3(b), then the waveform of an output of the differentiating circuit 9 will become as shown in FIG. 3(c). Since the triangular mask 7a is arranged as described above with respect to the beam scanning direction, a peak voltage V1 of the differentiated output contains data indicating the diameter of the light beam in the main scanning direction, and a peak voltage V2 thereof contains data indicating the diameters of the light beam in both main and auxiliary scanning directions.

That is, as shown in FIG. 4(a), if the diameter of a beam spot B in the main scanning direction is large, the rise of an output of the beam spot detector 7 becomes smooth such as shown in FIG. 4(b) with the differentiated waveform thereof being such as shown in FIG. 4(c). On the other hand, if the diameter of the beam spot B in the main scanning direction is small as shown in FIG. 4(d), the rise of an output of the beam spot detector 7 becomes steep as shown in FIG. 4(e) with the differentiated waveform thereof having a peak so high as shown in FIG. 4(f).

As is apparent from a comparison between the waveforms of FIGS. 4(c) and 4(f), the voltage V1 of the differentiated waveform of the small beam spot diameter in the main scanning direction becomes larger than that of the large beam spot diameter in the main scanning direction.

Then, when the beam of light is out of the triangular mask 7a, the waveforms become as shown in FIGS. 5(a) to 5(f). As shown in FIG. 5(a), if the diameter of the beam spot B is long in the auxiliary scanning direction, the fall of an output of the beam spot detector 7 is smooth as shown in FIG. 5(b) with the differentiated waveform thereof being such as shown in FIG. 5(c). On the other hand, if the diameter of the beam spot B is short in the auxiliary scanning direction as shown in FIG. 5(d), the fall of an output of the beam spot detector 7 becomes steep as shown in FIG. 5(e) with the differentiated waveform thereof being such as shown in FIG. 5(f).

As is apparent from the waveforms of FIGS. 5(c) and 5(f), the small beam spot diameter in the auxiliary scanning direction produces a larger voltage V2 of the differentiated waveform than the large beam spot diameter in the auxiliary scanning direction.

Further, as shown in FIGS. 5(a) to 5(f), when the beam spot B intersects the mask obliquely, it is both the diameter of the beam spot B in the main scanning direction and the diameter of the beam spot B in the auxiliary scanning direction that contribute to the time required for the beam spot B to pass through the mask.

Figure 6:
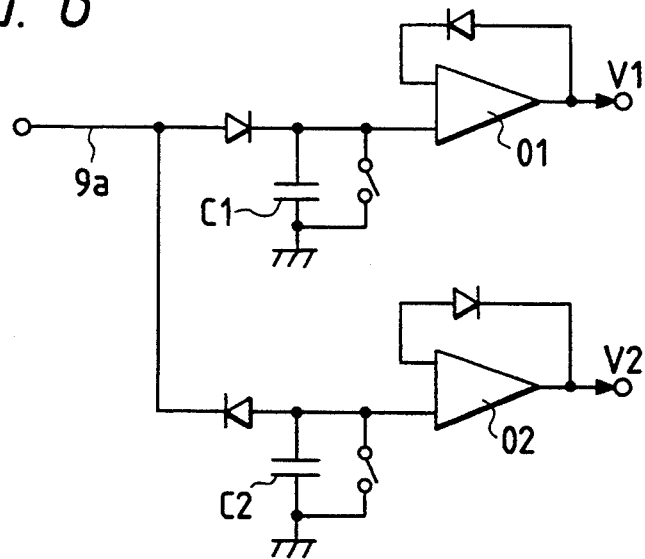
FIG. 6 is a circuit diagram showing an exemplary peak hold circuit.

FIG. 6 shows an example of the peak hold circuit for holding peaks of an output signal of the differentiating circuit 9. When an output signal 9a of the differentiated circuit 9 is received, a positive peak signal is held by a capacitor C1, and a negative peak signal is held by a capacitor C2. The positive peak hold signal V1 is outputted from an operational amplifier 01, whereas the negative peak hold signal V2 is outputted from an operational amplifier 02. The capacitors C1 and C2 may be reset using an output of, e.g., a sensor (not shown) that detects the scanning start timing of the beam of light.

Figure 7:
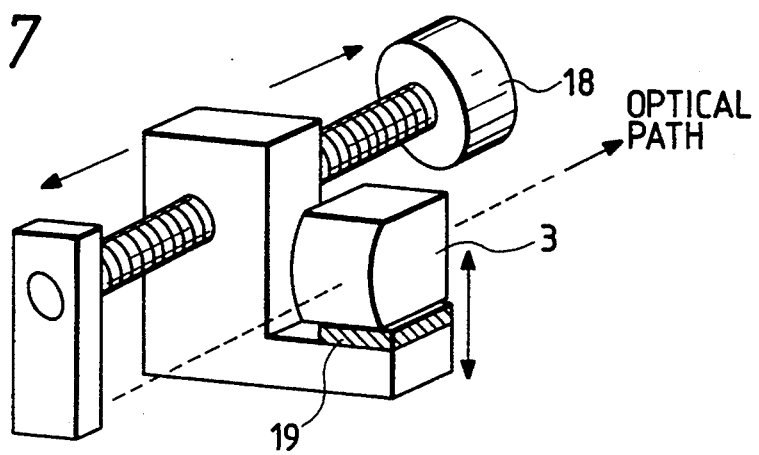
FIG. 7 is a perspective view showing an auxiliary scanning cylindrical lens adjusting mechanism.

FIG. 7 is a perspective view showing an example of a position adjusting device for adjusting the position of the auxiliary scanning cylindrical lens 3 in the direction of the optical axis and in the direction perpendicular to the optical axis. In FIG. 7, reference numeral 18 designates the motor for moving the auxiliary scanning cylindrical lens 3 in the direction of the optical axis; and 19, a PZT for moving the cylindrical lens 3 in the auxiliary scanning direction (in the vertical direction).

An operation of this embodiment will be described next with reference to FIG. 1.

A beam of light which scans a surface to be scanned in the main scanning direction through the rotary polygon mirror 4 is reflected onto the beam spot detector 7 every scan, the beam spot detector 7 being disposed on an extension coplanar with the photosensitive recording drum 6, which is the surface to be scanned. As shown in FIG. 2, e.g., the beam spot detector 7 has a triangular mask, and an output signal thereof is amplified by the amplifier 8 and then fed to the differentiating circuit 9 and the counter 14.

The differentiating circuit 9 outputs a signal having such a waveform as shown in FIG. 3(c). This differentiated output is applied to the peak hold circuit 10 so that both positive and negative peak values are held by the peak hold circuit 10. The outputs of the peak hold circuit 10 are applied to the CPU 11. The CPU 11 calculates the diameter of the beam in the main scanning direction from the positive peak value. As described above, the negative peak value is composed of the beam diameter component in the main scanning direction and the beam diameter component in the auxiliary scanning direction, and the ratio of these components differ from one inclination of the mask to another. Therefore, the diameter of the beam in the auxiliary scanning direction is calculated from the already calculated diameter of the beam in the main scanning direction and the inclination of the mask.

The CPU 11 then outputs a main scanning direction adjusting signal and an auxiliary scanning direction adjusting signal to the D/A converter 12 so that the beam diameters in both main and auxiliary scanning directions can be adjusted to desired values. The D/A converter 12 converts the main and the auxiliary scanning direction signals into analog signals, and outputs such analog signals to the motor drive circuit 13. The motor drive circuit 13 adjusts the main scanning cylindrical lens 2 in the direction of the optical axis in accordance with the main scanning direction adjusting signal. The motor drive circuit 13 also adjusts the auxiliary scanning cylindrical lens 2 in the direction of the optical axis in accordance with the auxiliary scanning direction adjusting signal.

Figure 8:
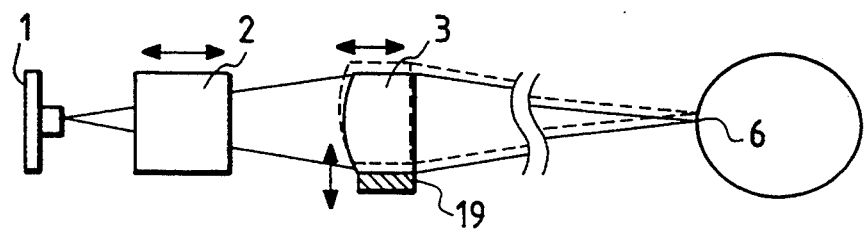
FIG. 8 is a diagram illustrative of adjustment of a displacement in the auxiliary scanning direction (displacement of registration)

Upon completion of the above adjustments, the cylindrical lens 3 for moving the focus in the auxiliary scanning direction is displaced in the vertical direction by a small distance as shown in FIG. 8. As a result, the position in the auxiliary scanning direction (registration) of the light beam that is scanning the photosensitive recording drum 6 is displaced.

This displacement can be calculated by counting the width (the detection time width At in FIG. 2(b)) of a beam detection signal by the counter 14. This count is fed to the CPU 15 to be compared with a predetermined reference. The CPU 15 then outputs a correction signal for correcting the difference between the count and the reference to the D/A converter 16. The D/A converter 16 converts the correction signal into an analog signal and outputs the analog signal to the PZT drive circuit 17. As a result, the PZT 18 shown in FIG. 7 or 8 makes a fine adjustment of the cylindrical lens 3 in the vertical direction.

As described above, this embodiment can correct the displacement of the beam of light which is scanning the photosensitive recording drum 6 from the focus with a simple construction and an easy operation.

Figure 9:
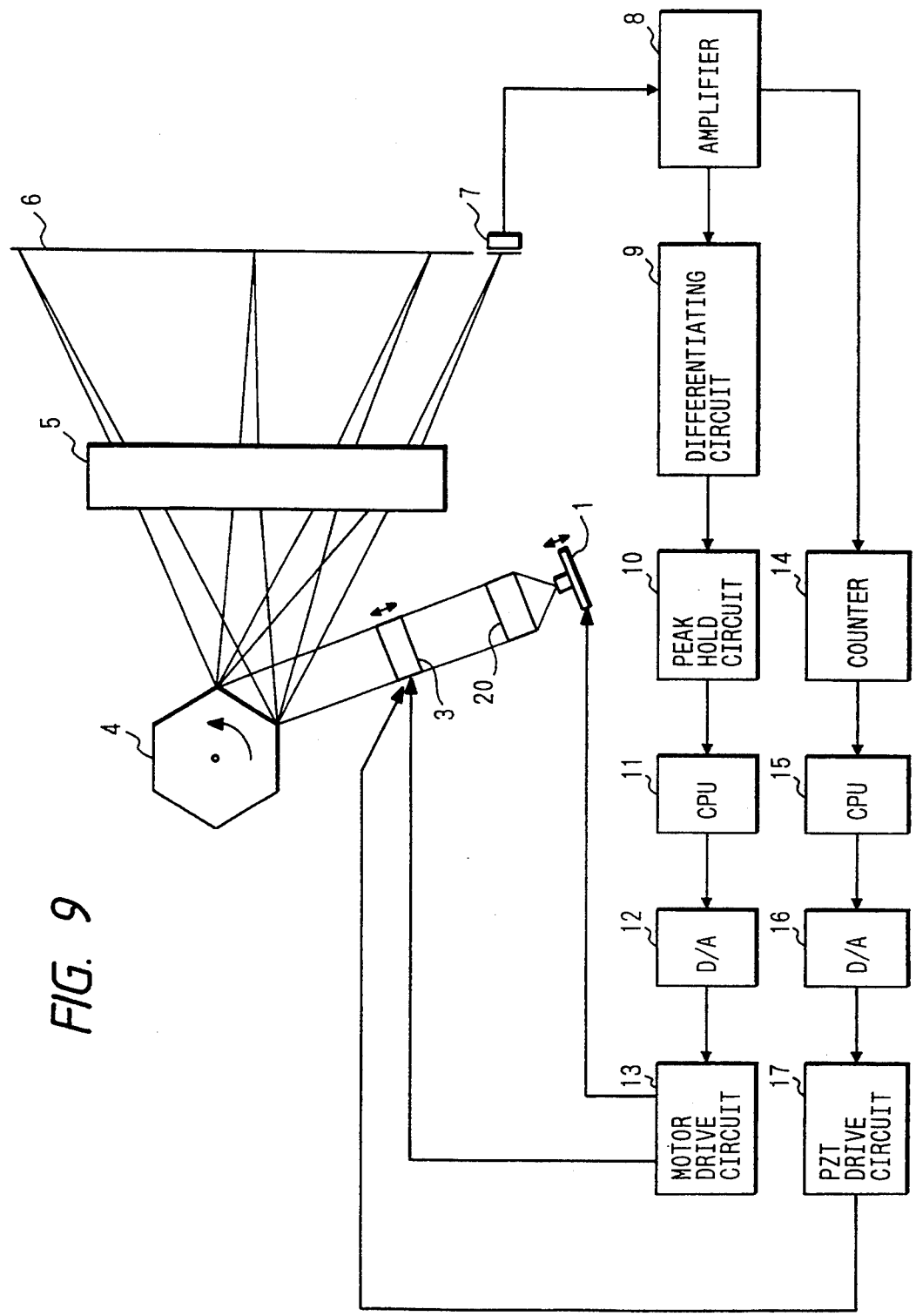
FIG. 9 is a block diagram showing a configuration according to a second embodiment of the invention.

A second embodiment of the invention will be described next with reference to FIG. 9. The second embodiment is distinguished from the first embodiment in that adjustment of the beam diameter in the main scanning direction is made by moving the laser beam source 1 in the direction of the optical axis.

The second embodiment can provide advantages similar to those of the first embodiment.

According to the first aspect of the invention, the displacement in the auxiliary scanning direction (the displacement of the registration) produced when the focus of the light beam is being corrected can be detected from the output of the single beam spot detector. Therefore, the displacement from the focus as well as the displacement in the auxiliary scanning direction can be detected with a simple construction and an easy operation According to the second aspect of the invention, the focus adjustment of the light beam as well as the displacement caused by such adjustment can be corrected with a simple construction and an easy operation. Therefore, highly accurate focus adjustment can be made.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A scanning optical system for directing a beam of light from a light source onto a surface to be scanned by causing the beam of light to scan and converge onto the surface to be scanned by a deflector and a lens system, said scanning optical system comprising:

a beam spot detector disposed on an extension of the surface to be scanned and having a mask with a side which the scanning beam of light intersects substantially perpendicularly and a side which the scanning beam of light intersects obliquely;

means for detecting conditions of convergence of the beam of light in a main scanning direction and in an auxiliary scanning direction from peak values of a differentiated waveform of a detected output from the beam spot detector;

means for automatically adjusting a diameter of the beam of light based on focus adjusting signals outputted from said light beam convergence condition detecting means;

means for detecting a displacement in the auxiliary scanning direction of the beam of light from a width of the detected output; and means for automatically correcting the displacement in the auxiliary scanning direction based on a correction signal outputted form said displacement detecting means, wherein the conditions of convergence and the displacement in the auxiliary scanning direction of the beam of light are detected using the same beam spot detector.

2. A scanning optical system according to claim 1, wherein said diameter adjusting means comprises a main scanning cylindrical lens having refractive power in a main scanning direction to move the focus in the main scanning direction and means for driving said main scanning cylindrical lens in the main scanning direction according to said focus adjusting signal, and said displacement correcting means comprises an auxiliary scanning cylindrical lens having refractive power in an auxiliary scanning direction and means for driving said auxiliary scanning cylindrical lens in the auxiliary scanning direction according to the correction signal from said displacement detecting means.

3. A scanning optical system according to claim 2, further comprising a unit for adjusting a position of said auxiliary scanning cylindrical lens in an optical axis direction and in a direction perpendicular to said optical axis, said position adjusting unit comprising a motor for moving said auxiliary scanning cylindrical lens in the optical axis direction and a piezoelectric element for moving said scanning cylindrical lens in the direction perpendicular to the optical axis direction.

* * * * *

UNITED STATES PATENT AND TRADEMARK OFFICE
CERTIFICATE OF CORRECTION

PATENT NO. : 5,442,171
DATED : August 15, 1995
INVENTOR(S) : Susumu ANZAI

It is certified that error appears in the above-indentified patent and that said Letters Patent is hereby corrected as shown below:

Claim 1, column 6, line 34, "form" should read --from--.

Signed and Sealed this

Sixth Day of August, 1996

Attest:

BRUCE LEHMAN

*Attesting Officer*  *Commissioner of Patents and Trademarks*